United States Patent
Jaspers

(10) Patent No.: US 12,313,265 B2
(45) Date of Patent: May 27, 2025

(54) GALLEY INSERT DOORS

(71) Applicant: B/E AEROSPACE, INC., Winston Salem, NC (US)

(72) Inventor: Marcus Michaël Cornelis Jaspers, Woerden (NL)

(73) Assignee: B/E Aerospace, Inc., Winston Salem, NC (US)

( * ) Notice: Subject to any disclaimer, the term of this patent is extended or adjusted under 35 U.S.C. 154(b) by 323 days.

(21) Appl. No.: 17/152,451

(22) Filed: Jan. 19, 2021

(65) Prior Publication Data

US 2022/0228753 A1   Jul. 21, 2022

(51) Int. Cl.
| | | |
|---|---|---|
| F24C 15/02 | (2006.01) | |
| B64D 11/04 | (2006.01) | |
| E06B 3/70 | (2006.01) | |

(52) U.S. Cl.
CPC .............. *F24C 15/02* (2013.01); *B64D 11/04* (2013.01); *E06B 3/7015* (2013.01); *F24C 15/024* (2013.01); *E06B 2003/7051* (2013.01)

(58) Field of Classification Search
CPC ........ F24C 15/02; F24C 15/024; B64D 11/04; E06B 3/7015; E06B 2003/7051
USPC ........................................................ 126/190
See application file for complete search history.

(56) References Cited

U.S. PATENT DOCUMENTS

| | | | |
|---|---|---|---|
| 5,107,821 A | 4/1992 | von Blanquet | |
| 9,387,932 B2 * | 7/2016 | Lee | B64D 11/04 |
| 2005/0218615 A1 * | 10/2005 | Hu | B62B 3/006 |
| | | | 280/47.35 |
| 2014/0366454 A1 * | 12/2014 | Burd | B64D 11/04 |
| | | | 49/475.1 |
| 2015/0041100 A1 * | 2/2015 | Huang | A47B 31/06 |
| | | | 219/214 |
| 2019/0002105 A1 * | 1/2019 | Moran | B64D 11/0007 |
| 2020/0248907 A1 * | 8/2020 | Klok | B64D 11/04 |
| 2021/0323653 A1 * | 10/2021 | Tracey | B64C 1/1461 |
| 2022/0055831 A1 * | 2/2022 | Burd | B64D 11/02 |

(Continued)

FOREIGN PATENT DOCUMENTS

| | | |
|---|---|---|
| EP | 3895989 | 10/2021 |
| WO | 2020229236 A1 | 11/2020 |

OTHER PUBLICATIONS

Extended European Search Report dated May 19, 2022, issued during the prosecution of European Patent Application No. EP 22152082.8, 6 pages.

(Continued)

*Primary Examiner* — Allen R. B. Schult
*Assistant Examiner* — William C Weinert
(74) *Attorney, Agent, or Firm* — SNELL & WILMER L.L.P.

(57) ABSTRACT

A galley insert includes an oven housing defining an interior cavity and an oven door movably connected to the insert housing. The insert door comprises an interior surface and an exterior surface. The interior surface faces the interior cavity when the insert door is in a closed position. The exterior surface is opposite from the interior surface and faces away from the interior cavity when the insert door is in a closed position. A first portion of the interior surface extends further into the cavity when the insert door is in a closed position than a second portion of the interior surface.

15 Claims, 3 Drawing Sheets

(56) References Cited

U.S. PATENT DOCUMENTS

2022/0186535 A1\* 6/2022 Keskin .................. B64D 11/04

OTHER PUBLICATIONS

Ipeco, "Aircraft galley excellence", dated Mar. 1, 2019, pp. 1, XP93104588, Retrieved from the Internet: url: https://www.ipeco.com/wp-content/uploads/2019/03/GALLEYBROCHURE.pdf, [retrieved on Nov. 22, 2023].
European Patent Office, European Office Action dated Nov. 30, 2023 in Application No. 22152082.8.

\* cited by examiner

GALLEY INSERT DOORS

BACKGROUND

1. Field

The present disclosure relates to galley inserts, and more particularly to insert doors for use on galley inserts, such as those found on galley ovens in commercial aircraft.

2. Description of Related Art

Many commercial aircraft include a "galley," which is the internal structure used by the flight attendants to prepare food and beverages for the passengers. Space and weight constraints generally require the equipment (or "inserts") within the galley to be compact and ordered in a specific way. The inserts can be a variety of powered items such as a coffee brewer, an oven, a trash compactor, refrigerator, or any other electrical appliance that can be found in the galley area. With oven inserts, keeping the external temperatures of the oven door within the required limits can pose challenges. In particular, space and weight considerations make certain solutions unavailable. Additionally, future regulations may require temperature scanning of the door such that the hottest positions (as opposed to an average across the door) also must stay within certain limits, making external temperature limits even harder to meet.

The conventional techniques have been considered satisfactory for their intended purpose. However, there is an ever present need for improved systems and methods for oven door external temperature control. This disclosure provides a solution for this need.

SUMMARY

A galley insert includes an insert housing defining an interior cavity and an insert door movably connected to the insert housing. The insert door comprises an interior surface and an exterior surface. The interior surface faces the interior cavity when the insert door is in a closed position. The exterior surface is opposite from the interior surface and faces away from the interior cavity when the insert door is in a closed position. A first portion of the interior surface extends further into the cavity when the insert door is in a closed position than a second portion of the interior surface.

In some embodiments, the insert door includes a handle connected to the exterior surface. The first portion of the interior surface can be positioned opposite from the handle. The exterior surface of the insert door can include a recessed surface configured and adapted to accommodate for user access to the door. The insert door can include a handle extending across the recessed surface of the door. The first portion of the interior surface can be positioned opposite from the handle.

It is contemplated that a first door thickness can be defined between the first portion of the interior surface and the exterior surface opposite from the first portion is greater than a second door thickness defined between the second portion of the interior surface and the exterior surface opposite from the second portion. The galley insert can include a hinge connecting the insert door to the insert housing. The first portion of the interior surface can be further away from the hinge than the second portion of the interior surface.

The hinge can be connected to the insert door on a hinge side of the door. The insert door can include an outer side of the door opposite from the hinge side. A door thickness defined between the interior surface and the exterior surface can increase from the hinge side of the door to the outer side of the door. The door thickness can increase from the hinge side of the door to the outer side of the door in a linear manner. The hinge can define a hinge axis. A door cross-section taken perpendicular to the hinge axis can include, on the interior surface of the door, at least one of an arcuate portion, a ramp portion or a stepped portion. A shape formed from first portion of the interior surface can define a longitudinal axis parallel to the hinge axis.

The interior surface can include a metallic material. The exterior surface can include a plastic material. The insert door can include insulation material positioned between the interior surface and the exterior surface of the insert door. The galley insert can be an oven insert. The exterior surface of the insert door can include a recessed surface. The first portion of the interior surface can be positioned opposite from the recessed surface.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
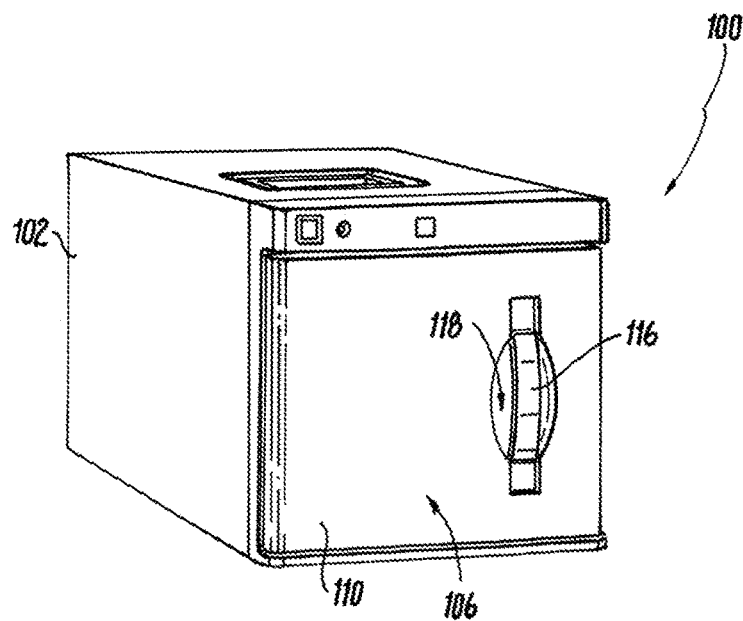
FIG. 1 is a schematic perspective view of a galley oven constructed in accordance with the present disclosure, showing the galley oven door in a closed position.

Reference will now be made to the drawings wherein like reference numerals identify similar structural features or aspects of the subject disclosure. For purposes of explanation and illustration, and not limitation, a partial view of an embodiment of a galley oven in accordance with the disclosure is shown in FIG. 1 and is designated generally by reference character 100. Other embodiments of systems in accordance with the disclosure, or aspects thereof, are provided in FIGS. 2-6C as will be described. The systems and methods described herein can provide a galley insert door, such as an oven door, with locally thickened areas which provide more insulation material in areas where it is needed, e.g., at the door cup and latching mechanism.

Figure 2:
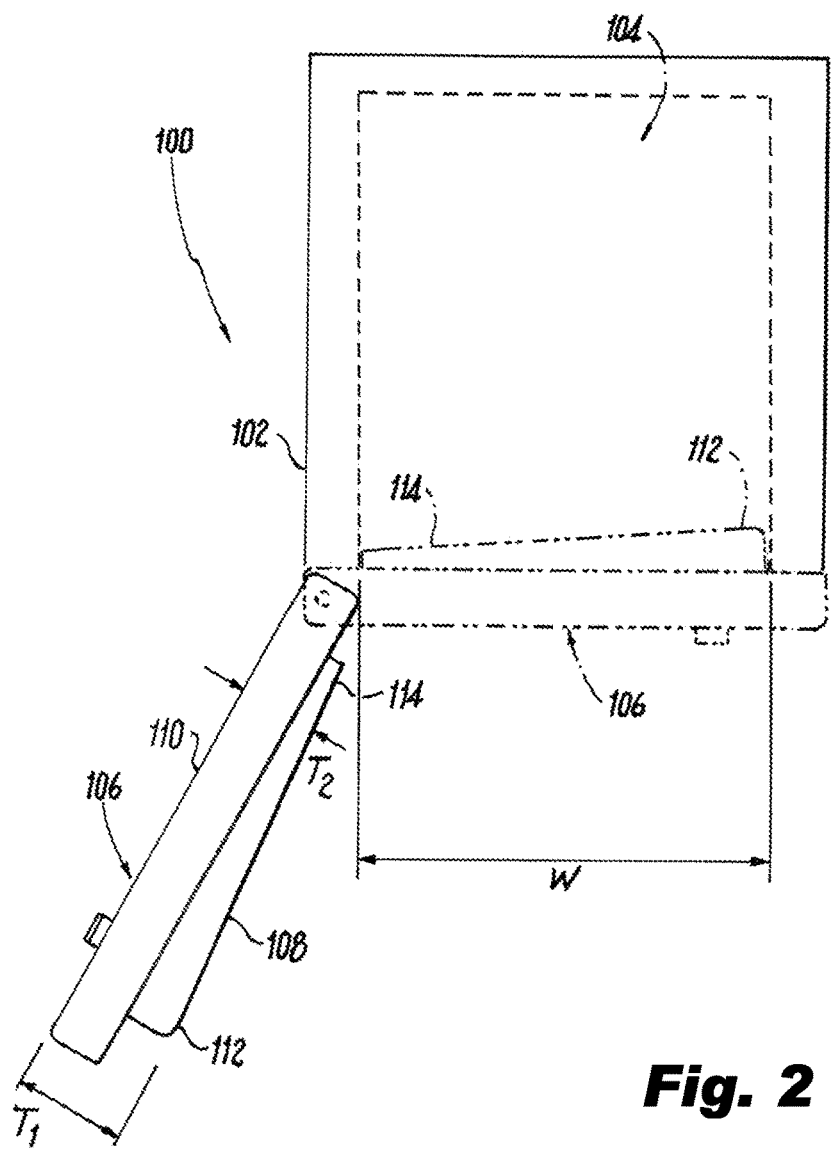
FIG. 2 is a schematic top plan view of the galley oven of FIG. 1, showing the galley oven door in an open position.

As shown in FIGS. 1-2, a galley insert, e.g. a galley oven 100, includes an oven housing 102 defining an interior cavity 104 and an oven door 106 movably connected to the oven housing 102. While the galley insert shown and described herein is an oven, the embodiments of the present disclosure can be applied to a variety of galley inserts, such as coffee brewer, an oven, a trash compactor, refrigerator, or any other electrical appliance. The oven door 106 comprises an interior surface 108 and an exterior surface 110. The interior surface 108 faces the interior cavity 104 when the oven door 106 is in a closed position. The interior surface 108 comprises a metallic material. The exterior surface 110 comprises a plastic material. The oven door 106 includes insulation material 126 positioned between the interior surface 108 and the exterior surface 110. The galley oven 100 includes a hinge 120 connecting the oven door 106 to the oven housing 102. The hinge 120 defines a hinge 120 axis A. The hinge 120 is connected to the oven door 106 on a hinge side 122 of the door. The oven door 106 includes an outer side 124 of the door opposite from the hinge side 122.

With continued reference to FIGS. 1-2, the exterior surface 110 is opposite from the interior surface 108 and faces away from the interior cavity 104 when the oven door 106 is in a closed position, shown in FIG. 1. A first portion 112 of the interior surface 108 extends further into the cavity when the oven door 106 is in a closed position (shown in broken lines in FIG. 2) than a second portion 114 of the interior surface 108. In this way, the doors can be thickened relative to traditional galley oven doors (with constant thickness), without interfering with the clearance required to remove a tray from the cavity of the galley oven and without having to be thickened towards the exterior surface 110 as it may stick out to far from the housing. In order adequate clearance such that a meal carrier tray can be moved in and out of the cavity, a certain clearance width W must be maintained when the door is in the opened position. The required clearance width W limits how much the door can be thickened (adding material to the cavity side) proximate to the hinge side 122. Further away from the hinge 120, however, more space is opened up for additional thickness.

As shown in FIGS. 1-2, the oven door 106 includes a handle 116 connected to the exterior surface 110. The first portion 112 of the interior surface 108 is positioned opposite from the handle 116. The exterior surface 110 of the oven door 106 includes a recessed surface 118 configured and adapted to accommodate for user access to the door 106. The handle 116 extends across the recessed surface 118 of the door 106. The first portion 112 of the interior surface 108 is positioned opposite from the handle 116, which tends to experience higher temperature hot-spots on traditional oven doors. However, it is contemplated that thicker "first portion" areas can be placed at a variety of areas across the door 106 depending on the temperature profile across the door 106. For example, the additional material could be at a recessed portion for the door handle, or could also be used as a solution for other features on the door, e.g., a meal card holder, a hook to hang oven mittens or anything else.

Figure 3A:
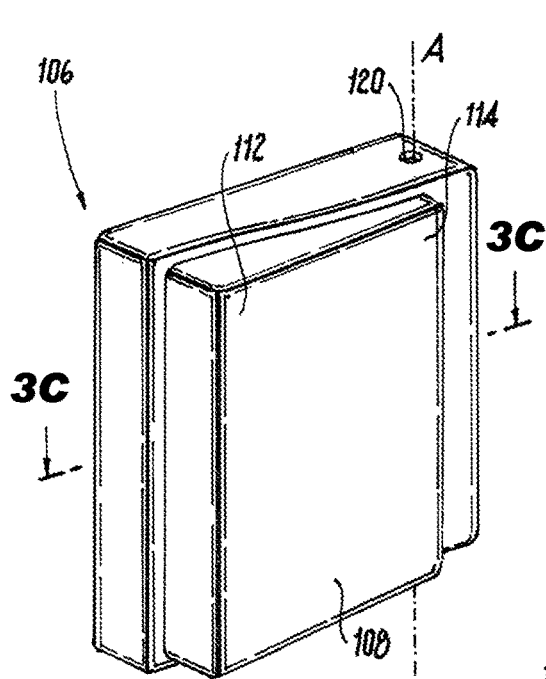
FIG. 3A is a schematic perspective view of the galley oven door of FIG. 1, showing the interior surface.
Figure 3B:
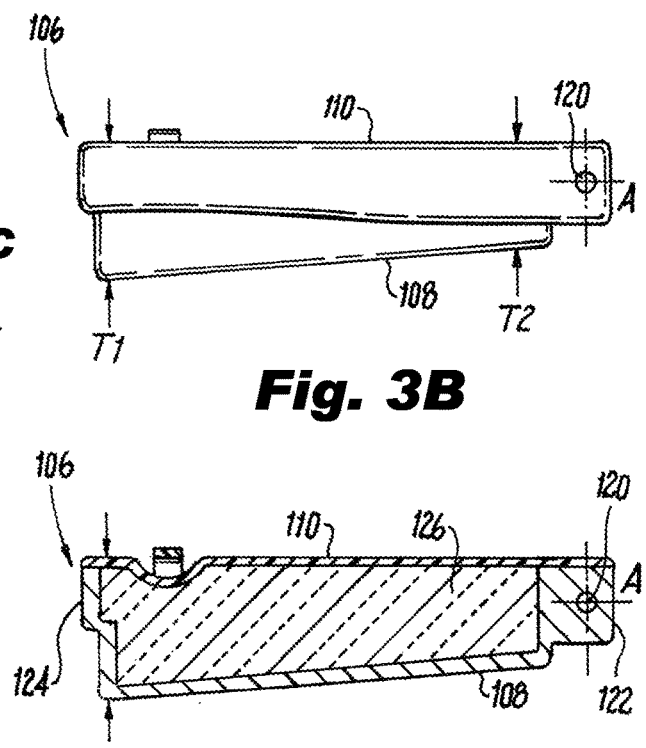
FIG. 3B is a schematic top plan view of the galley oven door of FIG. 1, showing the first portion of the interior surface extending out further than the second portion.
Figure 3C:
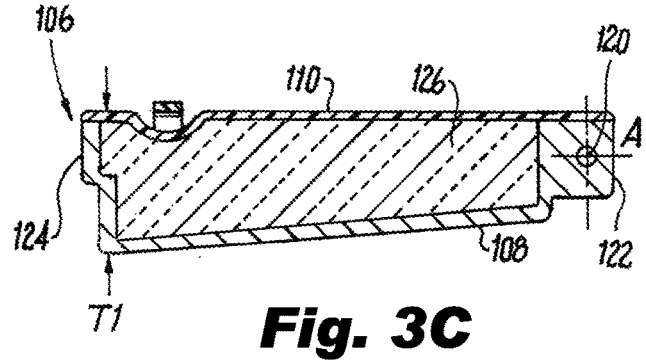
FIG. 3C is a schematic cross-sectional view of the galley oven door of FIG. 1, showing the thickened first portion of the interior surface.

As shown in FIGS. 2-3A, a first door thickness $T_1$ can be defined between the first portion 112 of the interior surface 108 and the exterior surface 110 opposite from the first portion 112 is greater than a second door thickness $T_2$ defined between the second portion 114 of the interior surface 108 and the exterior surface 110 opposite from the second portion 114. The first portion 112 of the interior surface 108 is further away from the hinge 120 than the second portion 114 of the interior surface 108. The overall door thickness defined between the interior surface 108 and the exterior surface 110 increases from the hinge side 122 of the door 106 to the outer side 124 of the door 106. In general, when referring to the thickness, whether $T_1$, $T_2$ or of the door generally, the dimension is taken in a direction perpendicular to the exterior surface 110. The figures showing the various thicknesses are not to scale, generally the overall additional thickness, added at $T_1$ for example, is 5 mm. In the embodiment of FIGS. 3A-3C, the door thickness increases from the hinge side 122 of the door to the outer side 124 of the door in a linear manner. In FIG. 3C, a door cross-section taken perpendicular to the hinge axis A includes, on the interior surface 108 of the door 106 a ramp portion going upwards from the hinge side 122 to the outer side 124. The increased thickness in door 106 provides safe and comfortable external temperature surfaces on galley oven doors and meets more stringent requirements related to point temperature maximums. While the insert door 106 is described as having two portions, first portion 112 and second portion 114, those skilled in the art will readily appreciate that additional portions with varying thicknesses may be included, e.g. 3 or more thickened portions on the door.

Figure 4A:
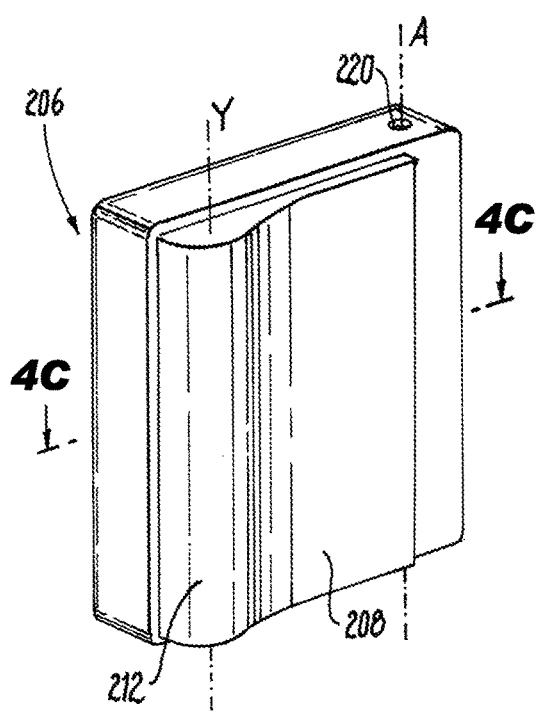
FIG. 4A is a schematic perspective view of another embodiment of a galley oven door constructed in accordance with the present disclosure, showing the interior surface.
Figure 4B:
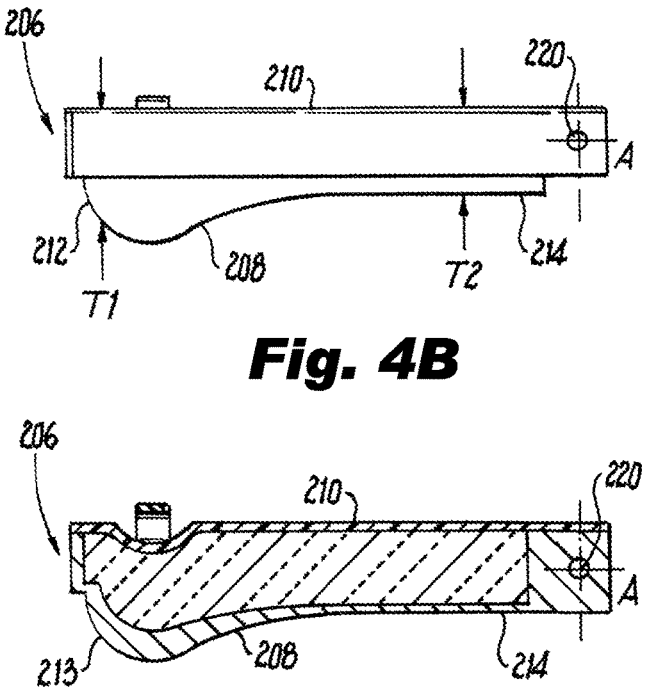
FIG. 4B is a schematic top plan view of the galley oven door of FIG. 4A, showing the first portion of the interior surface extending out further than the second portion.
Figure 4C:
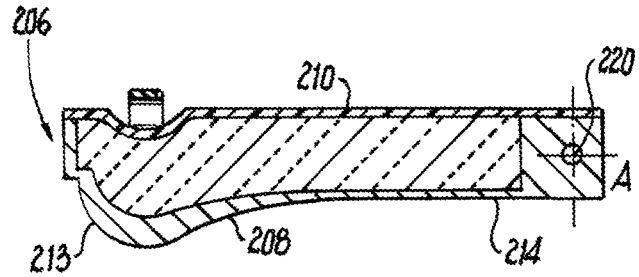
FIG. 4C is a schematic cross-sectional view of the galley oven door of FIG. 4A, showing the thickened first portion of the interior surface.

As shown in FIGS. 4A-4C an alternative embodiment of a door 206 can be used in conjunction with the housing 102. Door 206 is generally the same as door 106 and includes an interior surface 208 and an exterior surface 210, similar to inner and outer surfaces 108 and 110 of door 106. The only difference between door 206 and door 106 is the position and shape of the locally thickened area, e.g. the first portion 212. On door 206, $T_1$ at first portion 212 is thicker than $T_2$ at a second portion 214 to provide similar additional insulation as described above. In FIGS. 4A-4C, a door cross-section taken perpendicular to a hinge axis A of a hinge 220 (similar to hinge 120) includes, on the interior surface 208 of the door, an arcuate portion 213. A shape formed from first portion 212 of the interior surface 208 defines a longitudinal axis Y parallel to the hinge axis A.

Figure 5A:
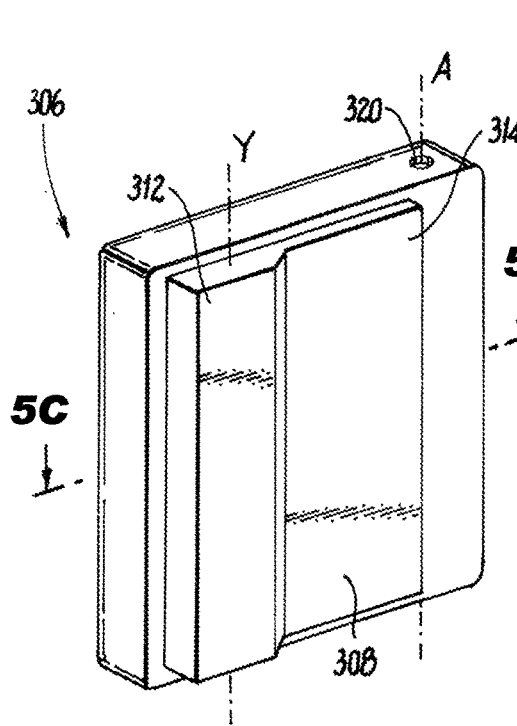
FIG. 5A is a schematic perspective view of another embodiment of a galley oven door constructed in accordance with the present disclosure, showing the interior surface.
Figure 5B:
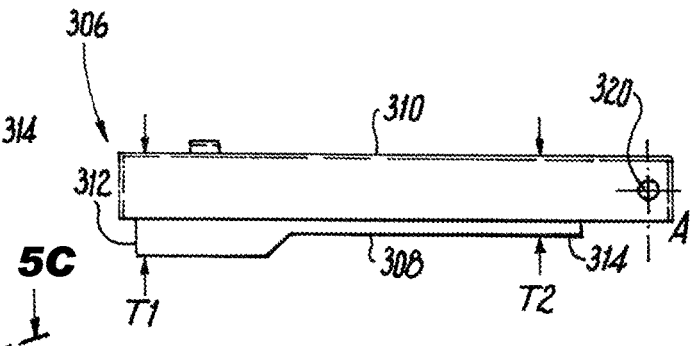
FIG. 5B is a schematic top plan view of the galley oven door of FIG. 5A, showing the first portion of the interior surface extending out further than the second portion.
Figure 5C:
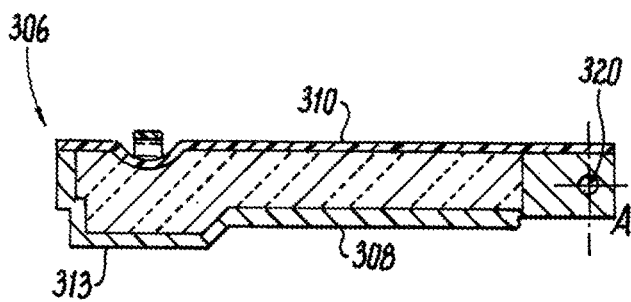
FIG. 5C is a schematic cross-sectional view of the galley oven door of FIG. 5A, showing the thickened first portion of the interior surface.

As shown in FIGS. 5A-5C an alternative embodiment of a door 306 can be used in conjunction with the housing 102. Door 306 is generally the same as door 106 and includes an interior surface 308 and an exterior surface 310, similar to inner and outer surfaces 108 and 110 of door 106. The only difference between door 306 and door 106 is the position and shape of the locally thickened area, e.g. the first portion 312. On door 306, $T_1$ at first portion 312 is thicker than $T_2$ at a second portion 314 to provide similar additional insulation as described above. In FIGS. 5A-5C, a door cross-section taken perpendicular to a hinge axis A of a hinge 320 (similar to hinge 120) includes, on the interior surface 308 of the door, a stepped portion 313. A shape formed from first portion 312 of the interior surface 308 defines a longitudinal axis Y parallel to the hinge axis A.

Figure 6A:
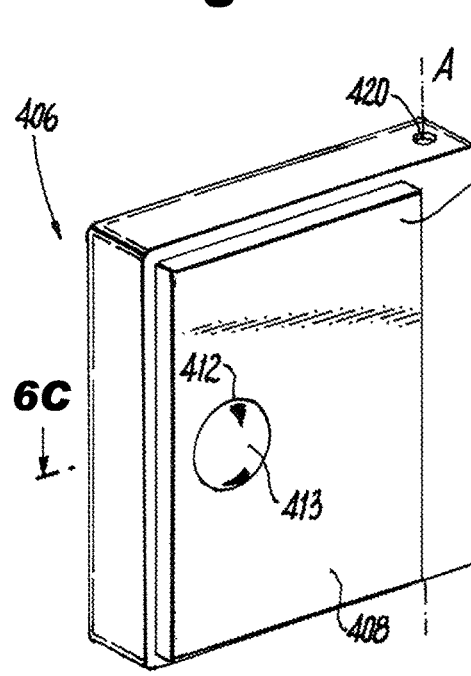
FIG. 6A is a schematic perspective view of another embodiment of a galley oven door constructed in accordance with the present disclosure, showing the interior surface.
Figure 6B:
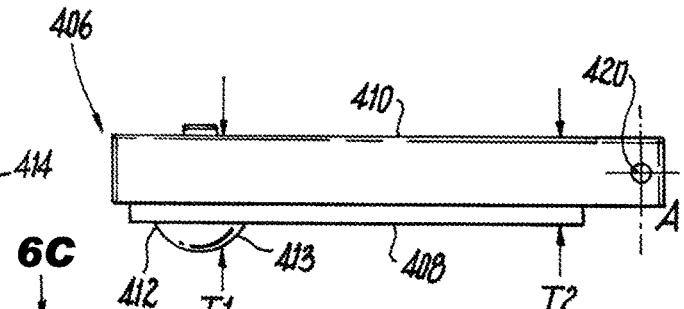
FIG. 6B is a schematic top plan view of the galley oven door of FIG. 6A, showing the first portion of the interior surface extending out further than the second portion.
Figure 6C:
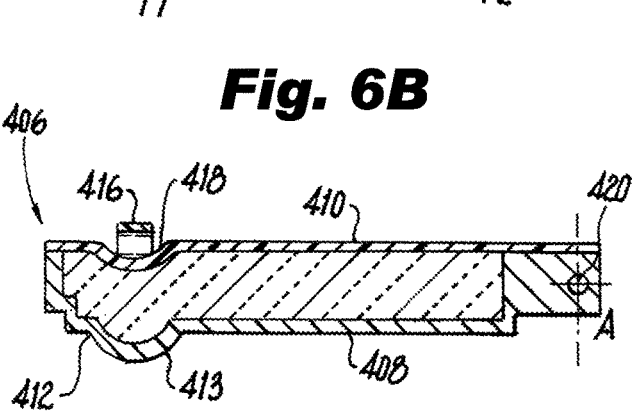
FIG. 6C is a schematic cross-sectional view of the galley oven door of FIG. 6A, showing the thickened first portion of the interior surface.

As shown in FIGS. 6A-6C an alternative embodiment of a door 406 can be used in conjunction with the housing 102. Door 406 is generally the same as door 106 and includes an interior surface 408 and an exterior surface 410, similar to inner and outer surfaces 108 and 110 of door 106. The only difference between door 406 and door 106 is the position and shape of the locally thickened area, e.g. the first portion 412. On door 406, a first portion 412 extends further into a cavity (e.g. cavity 104) of an insert housing (e.g. housing 102) than a second portion 414 of the interior surface 408 when the door 406 is in the closed position to provide similar additional insulation as described above. Because of the position of first portion 412 on door 406 across from a corresponding recessed portion 418, $T_1$ at first portion 412 may or may not be thicker than $T_2$ at a second portion 414. In FIGS. 6A-6C, a door cross-section taken perpendicular to a hinge axis A of a hinge 420 (similar to hinge 120) includes, on the interior surface 408 of the door, an arcuate portion 413. A shape formed from first portion 412 of the interior surface 408 is smaller in one direction, e.g. in the direction of the hinge axis A, but is still positioned in a cross-sectional plane common with a handle 416 and recessed portion 418 in order to provide the additional thermal protection for that area.

The methods and systems of the present disclosure, as described above and shown in the drawings, provide for galley ovens having oven doors with locally thickened areas which provide more insulation material in areas where it is needed, e.g., at the door cup and latching mechanism. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A galley insert comprising:
   an insert housing defining an interior cavity; and
   an insert door movably connected to the insert housing, the insert door comprising:
      an interior surface facing the interior cavity when the insert door is in a closed position;
      an exterior surface opposite from the interior surface and facing away from the interior cavity when the insert door is in the closed position, wherein a first portion of the interior surface extends further into the cavity when the insert door is in the closed position than a second portion of the interior surface, wherein the insert door includes insulation material positioned between the interior surface and the exterior surface of the insert door, wherein the first portion of the interior surface and a first portion of the insulation material extend further into the cavity when the insert door is in a closed position than the second portion of the interior surface and a second portion of the insulated material, wherein a first door thickness defined between the first portion of the interior surface and the exterior surface opposite from the first portion is greater than a second door thickness defined between the second portion of the interior surface and the exterior surface opposite from the second portion, wherein a thickness of the door is increased without interfering with a clearance required to remove a tray from the interior cavity of the insert housing and without the thickness of the insert door extending towards the exterior surface such that the insert door protrudes from the insert housing, wherein the second door thickness is immediately adjacent a hinge side of the insert door and the first door thickness is immediately adjacent an outer side of the insert door opposite the hinge side of the inset door, and wherein the thickness of the door increases from the second thickness on the hinge side of the insert door to the first thickness on the outer side of the insert door in a linear manner such that each intermediate thickness of the insert door from the second thickness to the first thickness is greater than a previous thickness; and
   a hinge connecting the insert door to the insert housing, wherein the first portion of the interior surface is further away from the hinge than the second portion of the interior surface.

2. The galley insert as recited in claim 1, wherein the insert door includes a handle connected to the exterior surface.

3. The galley insert as recited in claim 2, wherein the first portion of the interior surface is positioned opposite from the handle.

4. The galley insert as recited in claim 1, wherein the exterior surface of the insert door includes a recessed surface configured and adapted to accommodate for user access to the door.

5. The galley insert as recited in claim 4, wherein the insert door includes a handle extending across the recessed surface of the door.

6. The galley insert as recited in claim 5, wherein the first portion of the interior surface is positioned opposite from the handle.

7. The galley insert as recited in claim 1, wherein the hinge is connected to the insert door on the hinge side of the door.

8. The galley insert as recited in claim 1, wherein the hinge defines a hinge axis.

9. The galley insert as recited in claim 1, wherein the hinge defines a hinge axis, wherein a cross-sectional shape taken perpendicular to the hinge axis at the first portion of the interior surface defines a longitudinal axis parallel to the hinge axis.

10. The galley insert as recited in claim 1, wherein the interior surface comprises a metallic material.

11. The galley insert as recited in claim 1, wherein the exterior surface comprises a plastic material.

12. The galley insert as recited in claim 1, wherein the galley insert is an oven insert.

13. The galley insert as recited in claim 1, wherein the exterior surface of the insert door includes a recessed surface.

14. The galley insert as recited in claim 13, wherein the first portion of the interior surface is positioned opposite from the recessed surface.

15. The galley as recited in claim 1, wherein the first portion of the insulation material is thicker than the second portion of the insulation material.

* * * * *